June 19, 1956  C. B. GRADY, JR  2,751,495
FREQUENCY ERROR SENSING MEANS
Filed May 7, 1952
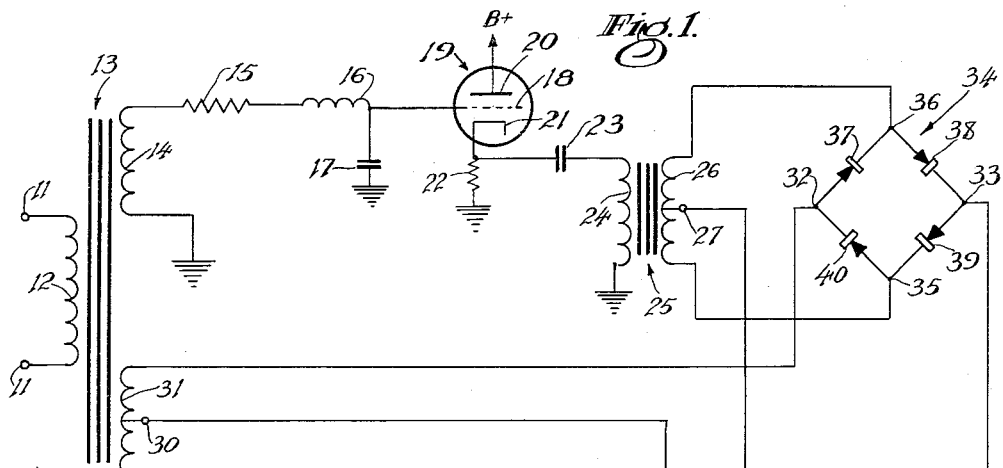
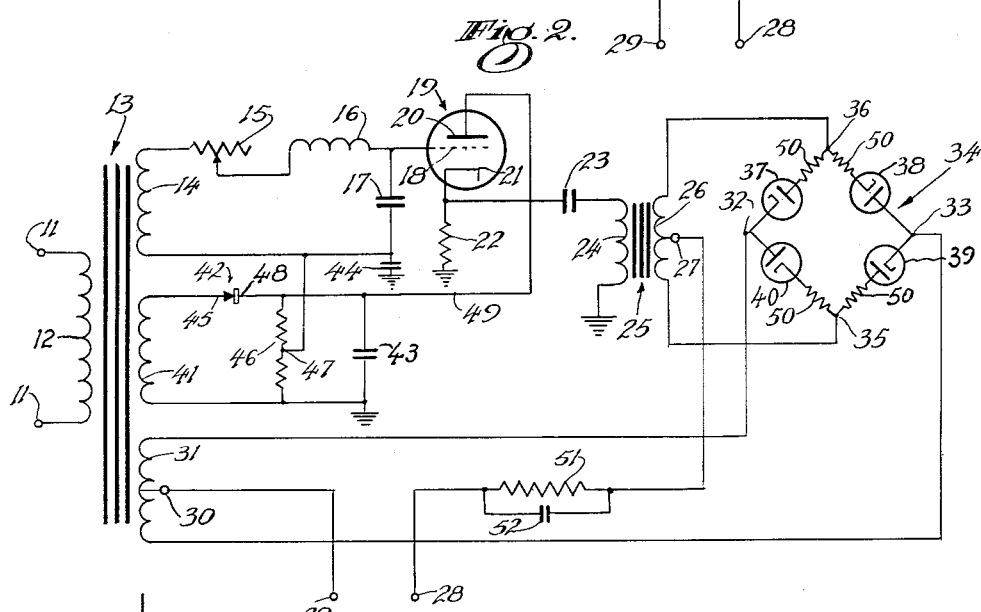
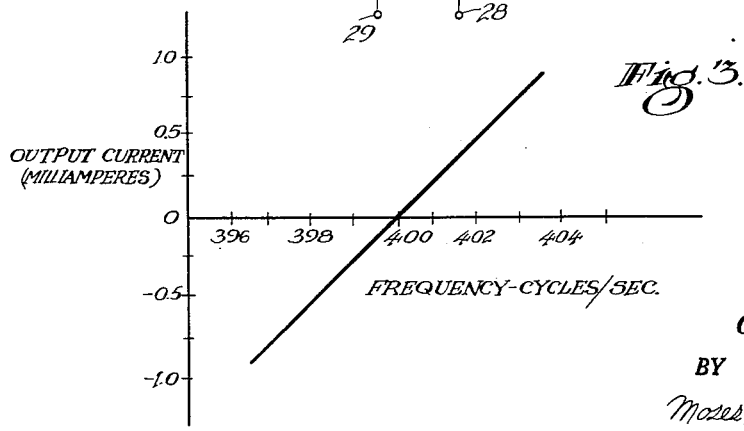
INVENTOR.
Charles B. Grady, Jr.
BY
Moses, Nolte, Crews & Berry
ATTORNEYS United States Patent Office 2,751,495
Patented June 19, 1956

2,751,495

FREQUENCY ERROR SENSING MEANS

Charles B. Grady, Jr., West Orange, N. J., assignor to The W. L. Maxson Corporation, New York, N. Y., a corporation of New York Application May 7, 1952, Serial No. 286,587

4 Claims. (Cl. 250—27)

The present invention relates to electrical alternating current frequency error sensing devices, and more particularly to devices of this character in which the frequency error is translated into a unidirectional control signal.

Among the objects of the invention is the provision of a frequency error sensing device in which the deviation of the frequency of an alternating current from a fixed predetermined value, is translated into a unidirectional control signal whose magnitude is approximately proportional to the magnitude of any small deviation, the polarity of the control signal being determined by the direction of such deviation.

A further object of the invention is to provide a device of this character, in which the control signal is suitable for use in conjunction with frequency controlling apparatus by which the frequency which has deviated may be varied to eliminate the frequency deviation.

Still another object of the invention is the provision of a device of this character which is energized in its entirety by an energy source whose frequency deviations are to be corrected.

The present invention is particularly useful in controlling the frequency of a converter or of an alternating current generator driven by a direct current motor. The unidirectional control signal may be used to vary the speed of the converter or of the driving motor by any one of many control systems known in the art, thereby maintaining the generator at the correct frequency. Other types of prime movers, such as internal combustion engines, may also be advantageously controlled by a unidirectional control signal of the type herein described.

A feature of the invention resides in the fact that the polarity of the control signal is determined by the direction of frequency deviation, thus greatly simplifying the problem of causing an increase or decrease in generator speed.

The translating device of the present invention is also so arranged that the output of the generator whose frequency is being controlled may be used directly as a power source for energization of the error sensing apparatus.

An important feature of the invention lies in its extreme simplicity and lack of moving parts.

Other and further objects will become apparent upon reading the following specification together with the accompanying drawing forming a part hereof.

Referring to the drawing:

Figure 1 is a schematic circuit diagram of an embodiment of the invention.

Figure 2 is similar to Figure 1, but includes circuits for energizing the device from the voltage source whose frequency is being controlled.

Figure 3 is a graph illustrating performance results obtained with a working embodiment of the invention according to Figure 2.

Referring to Figure 1, a pair of input terminals 11 are adapted to be connected to the voltage source whose frequency is to be controlled, and whose deviations from a fixed predetermined frequency are to be translated into a unidirectional control signal.

Input terminals 11 are shown connected to the primary winding 12 of a transformer designated generally as 13. Transformer 13 is provided with two secondary windings 14 and 31.

One terminal of secondary winding 14 is shown grounded, the other terminal being connected to a series circuit comprising a resistor 15, an inductor 16, and a capacitor 17, the circuit being completed by the grounding of one of the two terminals of the capacitor 17.

The ungrounded terminal of capacitor 17, which is also connected to inductor 16 is connected to the control grid 18 of a triode 19 which is preferably connected as a cathode follower in order to obtain a relatively low output impedance.

Anode 20 of triode 19 is connected directly to a suitable source of anode potential (not shown) the positive terminal of said source being designated B+. The negative terminal of the anode supply source is grounded in the usual manner.

The anode-cathode circuit of triode 19 is completed from its cathode 21 through a cathode resistor 22 to ground. The output derived across cathode resistor 22 is applied through a coupling and blocking capacitor 23 to the primary winding 24 of a transformer designated generally as 25.

The secondary winding 26 of transformer 25 is center-tapped at 27 and the center tap point 27 is connected to an output terminal 28 which is one of a pair of output terminals 28 and 29. The other output terminal 29 is connected to a center tap point 30 on the secondary winding 31 of transformer 13.

The full voltage of secondary winding 31 is applied to the points 32 and 33 of a phase detecting bridge designated generally as 34, the other conjugate points 35 and 36 of the phase detecting bridge 34 being connected to receive the full voltage from the secondary winding 26 of transformer 25.

The phase detecting bridge 34 comprises four non-linear rectifier elements 37, 38, 39 and 40 which are connected, as illustrated in Figures 1 and 2 of the drawing, with their polarities such that current may flow only in a clockwise direction from point to point around the points 32, 36, 33 and 35 in the order named. This same arrangement of rectifier connections is used in a conventional ring modulator, except that in the phase detecting bridge, the input and output connections are different, being so arranged that a direct current output is derived from the center tap points 27 and 30 of the transformer secondaries 26 and 31 respectively, the two inputs whose quadrature phase relationship is to be determined, being connected from the full transformer secondaries 26 and 31 to the conjugate points 35—36 and 32—33 respectively, of the rectifier ring.

Referring to Figure 2, the transformer 13 is shown provided with a third winding 41 connected to supply alternating current to a half-wave rectifier 42. The direct current output of rectifier 42 is connected to a filter capacitor 43 which reduces the amount of ripple present in the output. A tapped bleeder resistor 46 is shown connected across the output of rectifier 42, a suitably selected tap point 47 being connected to supply an appropriate biasing potential to the grid 18 of triode 19, a blocking capacitor 44 being connected in the grid return circuit to ground.

The positive terminal 48 of rectifier 42 is connected directly to anode 20 of triode 19 via conductor 49, and the negative terminal 45 is returned to ground through the secondary winding 41 of transformer 13.

The output of triode 19 appearing across cathode resistor 22 is connected to the primary winding 24 of transformer 25 through the blocking capacitor 23.

The resistor 15 has been indicated as being adjustable, and each of the rectifiers 37 to 40 has been shown as a diode provided with a series load resistor 50. A filter comprising the parallel combination of a resistor 51 and capacitor 52 has been serially included in the output connection to terminal 28.

In other respects Figure 2 is the same as Figure 1.

Generally, Figure 2 differs from Figure 1 principally by the inclusion in transformer 13 of the power supply secondary winding 41. The power supply rectifier 42 is connected to winding 41, and hence coupled to primary winding 12 of input transformer 13, so that complete energization of the frequency error sensing device is effected from the power source whose frequency deviations are being translated into a control potential.

In operation, the inductance value of inductor 16 and the capacitance value of capacitor 17 are so selected that the resonant frequency of the series combination is the fixed predetermined frequency from which deviations are to be determined. The resistor 15 serves to limit the current flow through the series circuit comprising inductor 16 and capacitor 17.

The resistor 15 further serves to broaden the tuning of the series resonant circuit 15—16—17 and to produce an effective bandwidth of frequency response which includes a larger range of frequencies than the normal range of frequency deviations. This permits the frequency error sensing means to respond to abnormal deviations, such as those caused by transient conditions. If a sharply tuned circuit having a narrow bandwidth were to be used, large frequency errors of a transient nature would swing outside the control range, thereby producing an error signal of small magnitude incompatible with the large frequency error, such a signal is of insufficient magnitude to effect proper frequency correction, particularly where the frequency error sensing means is being used for purposes of frequency regulation and control.

Under conditions of resonance, the inductive reactance of inductor 16 will be equal to the capacitative reactance of capacitor 17. The potential across capacitor 17 which is applied to the grid 18 of triode 19 will therefore be in quadrature phase relationship with respect to the potential across secondary winding 31 of transformer 13. The amplified voltage appearing at the secondary winding 26 of transformer 25 will therefore normally be in quadrature phase relationship with respect to the voltage across the secondary winding 31 of transformer 13.

The secondary winding 31 is connected to the points 32—33 of phase detecting bridge 34 and the secondary winding 26 is connected to the conjugate points 35—36 of the bridge. The output voltage between the center tap points 30 and 27 of the secondary windings 31 and 26 respectively will be zero when the two voltages are in quadrature phase relationship, and its direction and magnitude will vary in accordance with the magnitude and direction of any departure from this quadrature phase relationship. Phase detector bridges of this character are known in art and details of its theory of operation are not necessary.

Referring to Figure 3, a graph is shown which illustrates the actual performance of an embodiment of the invention in accordance with Figure 2.

The input voltage applied to terminals 11 is 115 volts at a frequency of 400 cycles. The output is given in milliamperes of direct current supplied to the input of a magnetic amplifier or similar device (not shown) connected to output terminals 28 and 29.

The secondary voltages of transformer 13 are 6 volts for winding 14; 125 volts for winding 41; and 30 volts center-tapped (15 volts at each side of center tap 30) for winding 31.

The other circuit elements are as follows:

| | |
|---|---|
| Resistor 15 | 15 ohms, adjustable. |
| Inductor 16 | 0.2 henry. |
| Capacitor 17 | 0.83 microfarad. |
| Triode 19 | Type 5718. |
| Resistor 22 | 5,600 ohms. |
| Capacitor 23 | 0.47 microfarad. |
| Rectifiers 37 to 40 | Type 5647 diodes. |
| Capacitor 43 | 2.0 microfarads. |
| Capacitor 44 | 0.47 microfarad. |
| Resistor 46 | 18,000 ohms each half; 36,000 ohms total. |
| Resistors 50 | 470 ohms. |
| Resistor 51 | 820 ohms. |
| Capacitor 52 | 0.22 microfarad. |

From the above list of values for the circuit elements, it will be seen that series resistor 15 having a resistance value adjustable in the range around 15 ohms, is connected in a series resonant circuit having the inductance value of 0.2 henry and the capacitance value of 0.83 microfarad, the resonant angular velocity therefore being approximately 2500 radians per second or a frequency of 400 cycles. Without allowing for the effective A.-C. resistance of inductor 16 at 400 cycles, this gives a Q of about 34. If the effective resistance of inductor 16 is around 30–40 ohms, the Q of the resonant circuit will be brought down to a value of around 10. This low value of Q broadens the tuning of the resonant circuit, allowing the error sensing means to receive useful input signals over a bandwidth extending from about zero up to about 150% of the resonant frequency. In alternator control applications, to which the present invention is particularly suited, such a wide bandwidth is desirable because of possible transient conditions either in the load or in the prime mover. The broad tuning of the resonant circuit prevents the frequency error sensing device from losing control during large frequency excursions of a transient nature. If a sharply tuned circuit were to be used, no useful control signal would be obtained if the frequency were to change suddenly to a value outside the narrow pass-band of such a resonant circuit.

From Figure 3, it will be noted that the output current at terminals 28—29 changes substantially linearly by approximately a quarter milliampere for each cycle of frequency deviation from the predetermined value of 400 cycles.

I have shown what I believe to be the best embodiments of my invention. I do not wish, however, to be confined to the embodiments shown, but what I desire to secure by Letters Patent is the invention as defined in the appended claims.

I claim:

1. In a device responsive to deviation in the frequency of an alternating current source from a predetermined value, in combination: a series circuit comprising an inductor and a capacitor energized by said source, the inductance of the inductor and capacitance of the capacitor being such as to produce resonance at said predetermined frequency; amplifying means connected to said series circuit intermediate said inductor and said capacitor for deriving a potential therefrom shifted in phase with respect to the potential of said source by a phase angle of ninety degrees at said predetermined frequency; a first circuit means including a center tap connected to derive a potential directly from said source and independently from said amplifier; a second circuit means including a center tap connected to derive a potential from the potential derived by said amplifying means; four non-linear rectifying elements serially connected in a closed ring with connection points between adjacent rectifier elements, the several polarities being such that every rectifying element will permit current flow only in the same direction around the ring, two opposed connection points separated by two intervening rectifier elements of the ring being connected to the first circuit means and the other two conjugate opposed points being connected to the second circuit means; and a third circuit means connected between the center-taps of the first and second circuit means for deriving a unidirectional control signal therefrom whose magnitude and direction varies in accordance with the magnitude and direction of the deviation of said phase angle from said value of ninety degrees, the resonance curve of said series circuit being sufficiently broad to cause said output variation to be substantially linear throughout a predetermined range of variation in the frequency of said source and also to produce an output compatible with relatively large variation in the frequency of said source beyond said predetermined range.

2. The combination according to claim 1 in which the first and second circuit means each comprise an inductive winding, said winding having a center tap.

3. The combination according to claim 1 comprising further rectifying means energized by said source, said combination further comprising a fourth circuit means connecting said further rectifying means to said amplifying means for the energization of said amplifying means, at least in part, from said further rectifying means.

4. The combination according to claim 1, wherein said series circuit further comprises a resistor, whereby the bandwidth of response of said circuit to input signals is widened.

References Cited in the file of this patent

UNITED STATES PATENTS

| | | |
|---|---|---|
| 2,231,997 | Guanella | Feb. 18, 1941 |
| 2,296,092 | Crosby | Sept. 15, 1942 |
| 2,373,569 | Kannenberg | Apr. 10, 1945 |
| 2,433,350 | Earp | Dec. 30, 1947 |
| 2,443,195 | Pensyl | June 15, 1948 |
| 2,455,732 | Carter | Dec. 8, 1948 |
| 2,525,780 | Dennis | Oct. 17, 1950 |
| 2,645,765 | Bixby | July 14, 1953 |